(No Model.)

H. H. ENGELMAN.
NATURAL GAS BURNER.

No. 508,689. Patented Nov. 14, 1893.

WITNESSES
Carroll J. Webster
Floyd R. Webster

INVENTOR
Harry H. Engelman
By William Webster
Atty

THE NATIONAL LITHOGRAPHING COMPANY,
WASHINGTON, D. C.

UNITED STATES PATENT OFFICE.

HARRY H. ENGELMAN, OF TOLEDO, OHIO, ASSIGNOR OF TWO-THIRDS TO PAUL J. ENGELMAN AND ERSKINE H. POTTER, OF SAME PLACE.

NATURAL-GAS BURNER.

SPECIFICATION forming part of Letters Patent No. 508,689, dated November 14, 1893.

Application filed February 8, 1892. Serial No. 420,670. (No model.)

*To all whom it may concern:*

Be it known that I, HARRY H. ENGELMAN, of Toledo, county of Lucas, and State of Ohio, have invented certain new and useful Improvements in Natural-Gas Burners; and I do hereby declare that the following is a full, clear, and exact description of the invention, which will enable others skilled in the art to which it appertains to make and use the same, reference being had to the accompanying drawings, and to the figures of reference marked thereon, which form part of this specification.

My invention relates to an improved natural gas burner in which a regularity of gas pressure is maintained at the point of ignition.

The object of my invention is to provide for the incorporation of a quantity of air with the gas, and heating the mixture prior to combustion, whereby this regularity of pressure is maintained; and another object is to provide for the commingling of steam or vapor with the heated air and gas, whereby a hotter flame is produced.

With these objects in view, my invention consists of an annular water receptacle, the central wall of which forms the mixing chamber of the burner, and is provided with air inlets at its lower end, a gas supply pipe connected with said lower end, a cover for the water receptacle, having a central opening with notched edges, and a deflector supported above said cover and mixing chamber for the purpose of deflecting the flame which burns at the top of the mixing chamber.

Figure 1:
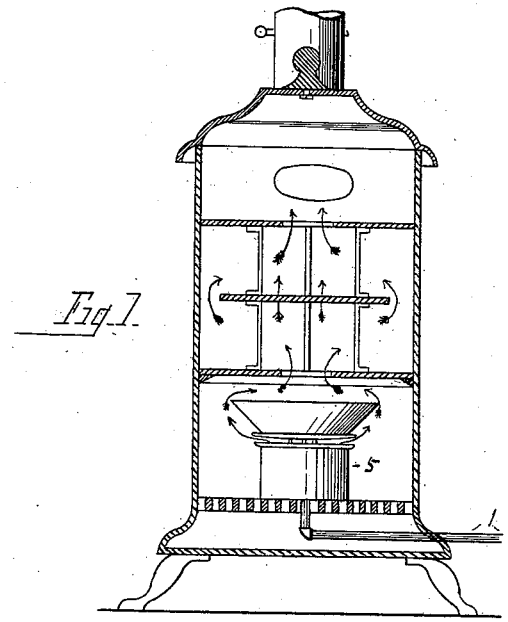
Figure 3:
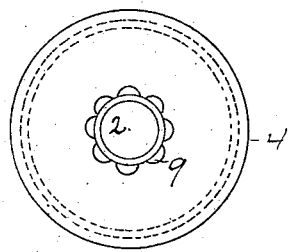
Figure 4:
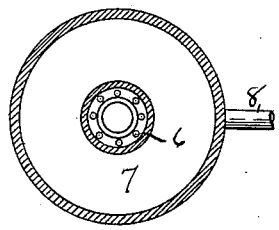
Figure 2:
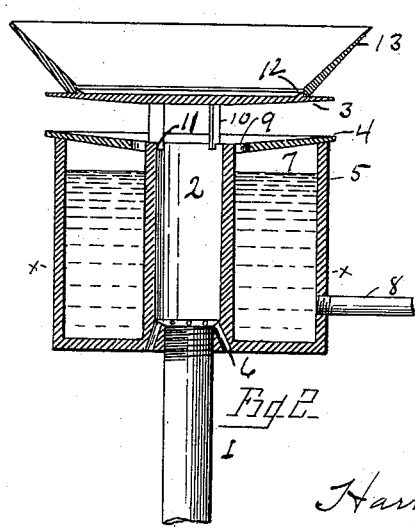

In the drawings forming a part of this specification, Figure 1 is a sectional view of a stove showing my improved burner as applied and used. Fig. 2 is a sectional view of the burner and controlling valve. Fig. 3 is a top plan with the deflector removed, and Fig. 4 is a bottom plan view.

In carrying out my invention I employ an annular water receptacle having the outer wall 5 and the central wall 2, which central wall constitutes the mixing chamber of the burner. In the bottom of this mixing chamber or central wall are produced the inclined air inlet holes 6, and in the lower end of the chamber 2 is secured the gas supply pipe 1, and by referring to the drawings it will be seen that the air inlet holes are outside of and project above the end of the gas pipe, so that at the air and gas will be commingled as they pass up into the heating and mixing chamber.

The water receptacle is supplied from a pipe 8, which extends to a tank 8' which is provided with an ordinary float valve so that the water in the receptacle is always kept at a definite level in the annular space 7.

4 designates a cover for the water receptacle, said cover being a central opening 9 to admit the upper end of the central wall or chamber 2, and the edges of this opening are notched as shown at 9' so that steam may escape from the water receptacle and mix with the commingled air and gas.

A deflector 3 is supported above the burner by means of the legs 10, having steps 11, to permit lateral movement, and upon the deflector may be arranged a saucer shaped receptacle 13 for holding asbestus, fire clay, and similar material for the purpose of radiating heat.

In operation, the annular chamber is partly filled with water from pipe 8, the cover 4 placed in position, and the deflector arranged above the burner. Gas is then turned on and ignited. The deflector causes the flame to impinge against the top 4 and sides 5 thus heating the burner, and water contained therein. This induces a current of air through the holes 6 into the chamber 2 where it mingles with the gas from pipe 1. The mixed air and gas then pass out of chamber 2, where they are ignited, and as the water is raised to the boiling point, the vapor escapes through the notches in the edge of the opening, thus commingling air, gas and steam, producing an extraordinary hot flame, and maintaining a regularity of pressure.

What I claim is—

In a burner, the combination with an annular water receptacle, of a cover for said receptacle, said cover having a central aperture with notched edges through which the upper end of the central wall of the water receptacle passes, said central wall constituting the mixing chamber of the burner, and provided with air inlets at its lower end, a gas supply secured also in the lower end, and a deflector located above the water receptacle and mixing chamber.

In testimony that I claim the foregoing as my own I hereby affix my signature in presence of two witnesses.

HARRY H. ENGELMAN.

Witnesses:
WILLIAM WEBSTER,
FLOYD R. WEBSTER.